United States Patent
Katagiri et al.

(10) Patent No.: US 11,400,602 B2
(45) Date of Patent: Aug. 2, 2022

(54) ROBOT SYSTEM

(71) Applicant: FANUC CORPORATION, Yamanashi (JP)

(72) Inventors: Taiki Katagiri, Yamanashi (JP); Masafumi Ooba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 138 days.

(21) Appl. No.: 17/026,369

(22) Filed: Sep. 21, 2020

(65) Prior Publication Data

US 2021/0114231 A1     Apr. 22, 2021

(30) Foreign Application Priority Data

Oct. 17, 2019   (JP) .............................. JP2019-189938

(51) Int. Cl.
    *B25J 13/08*        (2006.01)
    *B25J 9/16*         (2006.01)

(52) U.S. Cl.
    CPC ............. *B25J 13/088* (2013.01); *B25J 9/161* (2013.01); *B25J 9/1664* (2013.01)

(58) Field of Classification Search
    CPC ........ B25J 13/088; B25J 9/161; B25J 9/1664; B25J 9/1692; G05B 2219/36159; G05B 2219/39451
    USPC .................................................. 700/245–264
    See application file for complete search history.

(56) References Cited

U.S. PATENT DOCUMENTS

| | | | | |
|---|---|---|---|---|
| 7,236,854 B2* | 6/2007 | Pretlove | ................. | G05B 19/42 |
| | | | | 318/568.22 |
| 7,298,385 B2* | 11/2007 | Kazi | ..................... | B25J 9/1671 |
| | | | | 700/254 |
| 7,787,992 B2* | 8/2010 | Pretlove | ................. | G06Q 50/00 |
| | | | | 700/259 |
| 8,751,049 B2* | 6/2014 | Linder | ............... | G06Q 30/0641 |
| | | | | 345/173 |
| 9,268,406 B2* | 2/2016 | Geisner | ................... | G06F 3/017 |

(Continued)

FOREIGN PATENT DOCUMENTS

JP        2014180720 A     9/2014

*Primary Examiner* — Jaime Figueroa
(74) *Attorney, Agent, or Firm* — Studebaker & Brackett PC

(57) ABSTRACT

The present invention provides a robot system capable of, regardless of the type of the robot, precisely measuring the positional relationship between an AR device and markers, and comparatively easily and with high precision recognizing the position or orientation of the robot with the AR device. The robot system includes a marker detecting unit that simultaneously detects a reference marker and a robot coordinate system identification marker in one detection operation; a robot system information receiving unit that receives information regarding the robot system; a robot coordinate system identifying unit that identifies a coordinate system of a robot from the position of the robot coordinate system identification indicator and coordinate system information; an AR device that displays the information regarding the robot system, based on the coordinate system of the robot; a coordinate system setting unit that sets an origin by moving the robot to a designated position; and a coordinate system information transmission unit that transmits the coordinate system information set by the coordinate system setting unit to the AR device.

4 Claims, 4 Drawing Sheets

(56) References Cited

U.S. PATENT DOCUMENTS

| | | | | |
|---|---|---|---|---|
| 9,916,506 | B1* | 3/2018 | Davis | G06T 7/0002 |
| 9,964,765 | B2* | 5/2018 | Gardiner | G02B 27/017 |
| 10,078,916 | B2* | 9/2018 | Elazary | G06T 7/20 |
| 10,186,084 | B2* | 1/2019 | Tawara | G06V 10/245 |
| 10,504,231 | B2* | 12/2019 | Fiala | G06T 7/277 |
| 10,665,036 | B1* | 5/2020 | Ha | G06F 3/012 |
| 10,719,993 | B1* | 7/2020 | Ha | G06V 20/647 |
| 10,885,340 | B2* | 1/2021 | Ooba | G05B 19/4182 |
| 11,276,194 | B2* | 3/2022 | Tomochika | G06T 7/74 |
| 2004/0104935 | A1* | 6/2004 | Williamson | G06T 15/20 |
| | | | | 715/757 |
| 2005/0149231 | A1* | 7/2005 | Pretlove | B25J 9/1671 |
| | | | | 700/264 |
| 2005/0251290 | A1* | 11/2005 | Skourup | G05B 19/42 |
| | | | | 700/245 |
| 2005/0256611 | A1* | 11/2005 | Pretlove | G05B 19/42 |
| | | | | 700/264 |
| 2011/0169861 | A1* | 7/2011 | Suzuki | G06T 7/75 |
| | | | | 345/632 |
| 2011/0288964 | A1* | 11/2011 | Linder | B25J 9/1689 |
| | | | | 700/275 |
| 2014/0368542 | A1* | 12/2014 | Tawara | G06T 19/006 |
| | | | | 345/633 |
| 2017/0075116 | A1* | 3/2017 | Gardiner | G02B 27/017 |
| 2018/0005446 | A1* | 1/2018 | Elazary | G06T 11/60 |
| 2019/0389066 | A1* | 12/2019 | Jung | B25J 9/1674 |
| 2020/0034621 | A1* | 1/2020 | Ooba | G06V 20/20 |
| 2020/0316780 | A1* | 10/2020 | Rostrup | B25J 19/023 |
| 2021/0012524 | A1* | 1/2021 | Tomochika | G06V 10/242 |
| 2021/0021797 | A1* | 1/2021 | Miyoshi | G06F 3/011 |
| 2022/0024037 | A1* | 1/2022 | Lee | B25J 13/08 |

* cited by examiner

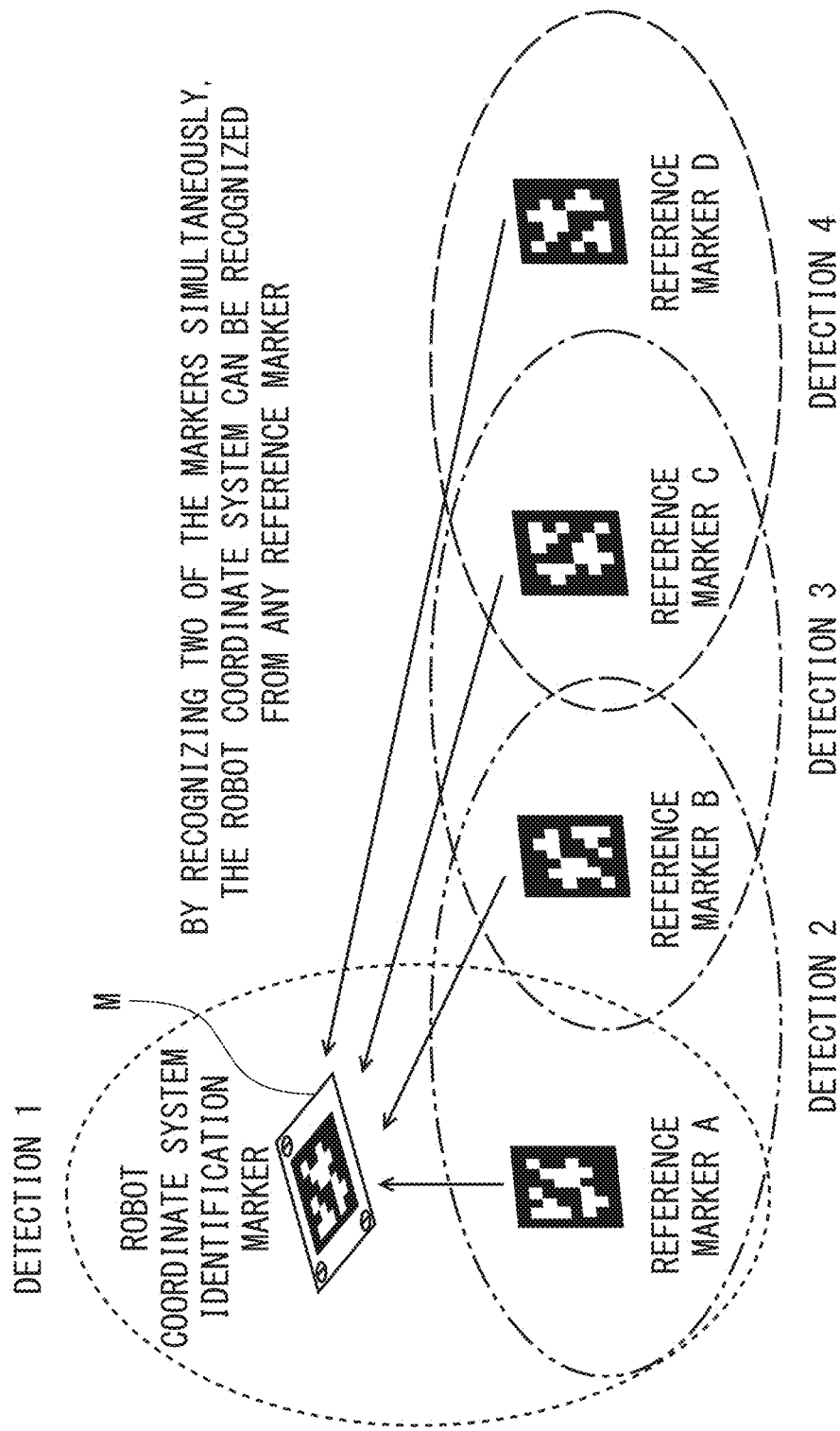

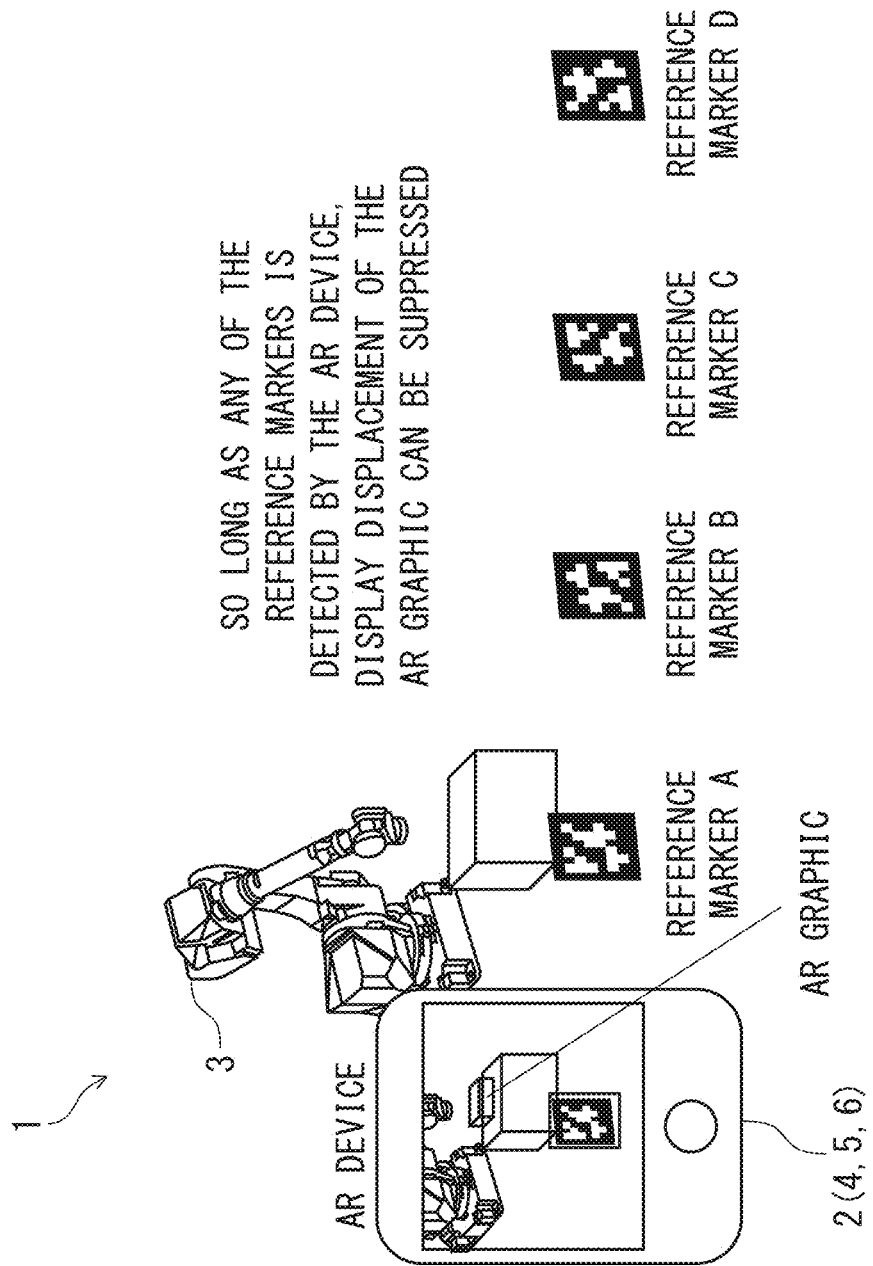

ROBOT SYSTEM

This application is based on and claims the benefit of priority from Japanese Patent Application No. 2019-189938, filed on 17 Oct. 2019, the content of which is incorporated herein by reference.

BACKGROUND OF THE INVENTION

Field of the Invention

The present invention relates to a robot system.

Related Art

In robot systems such as industrial robots, technology utilizing augmented reality (AR) is gaining attention, with an abundance of research and development being carried out.

This kind of robot system includes, for example, a configuration in which a Computer Generated (CG) image of a robot is generated based on an image of the robot captured by an imaging device, a user performs a touch operation on the CG image displayed on a touchscreen to operate the CG image robot on the touchscreen, whereby the actual robot is operated in tandem with the operation of the virtual robot.

Moreover, by overlaying setting information set in the robot system on the image of the robot to generate a CG image of the setting information, a user is able to understand the setting information more intuitively. In addition, the CG image of the setting information can be manipulated by a touch operation.

In this robot system, it is important to position compensate a movement destination of the robot, based on an image of an object to be processed captured by an imaging device, so that the robot moves in tandem with the object to be processed, and information regarding the positions of the robot, the imaging device, and the object to be processed must be set in advance.

Information regarding the positions of the robot, the imaging device, and the object to be processed includes, for example, (1) an origin and a direction of each axis of a coordinate system used as a reference for position compensation of the robot, (2) a position of the robot (rotation angle or translation amount of each joint of the robot, etc.) used as a reference for position compensation of the robot, (3) a relative positional relationship between the robot and the imaging device, and (4) a relative positional relationship between the imaging device and the object to be processed.

In addition, as a method for recognizing a robot coordinate system with an AR device, proposals have been made for a method in which a marker is placed at a specific position of a robot, and the coordinate system of the robot is recognized by detecting the marker with an AR device, a method in which the coordinate system of a robot is recognized by recognizing the shape of the robot with an AR device, a method in which the position and orientation of an AR graphic displayed at a predetermined position and orientation are manually aligned with the position and orientation of an actual robot, and so forth.

For example, Japanese Unexamined Patent Application, Publication No. 2014-180720 discloses "A robot system including: a robot arm; a camera configured to photograph a workpiece; a calibration jig mounted on a tip portion of the robot arm and having a marker that allows image recognition; and a calibration apparatus configured to derive a correlation between camera coordinates and robot coordinates, the camera coordinates being coordinates in an image photographed by the camera, the robot coordinates being coordinates using the robot arm as a reference. The calibration apparatus includes: an arm controller configured to control the robot arm to move the marker to a plurality of photographing positions within a plane approximately perpendicular to an optical axis of the camera in a state where the marker faces the camera; a camera-coordinate acquirer configured to acquire the camera coordinates of the marker to be obtained by photographing in the plurality of photographing positions; a posture-information acquirer configured to acquire information of the posture of the robot arm when the marker is photographed by the camera in the plurality of photographing positions; and a correlation derivation unit configured to derive the correlation between the camera coordinates and the robot coordinates based on the camera coordinates acquired by the camera-coordinate acquirer and the posture information acquired by the posture-information acquirer".

Patent Document 1: Japanese Unexamined Patent Application, Publication No. 2014-180720

SUMMARY OF THE INVENTION

However, in a method of recognizing a robot coordinate system by detecting markers with an AR device (augmented reality display device etc.), there is a need to determine in advance the positions at which to attach the markers, depending on the type of the robot. This places a heavy burden on the AR provider in terms of time and effort.

In a method of recognizing a robot coordinate system by recognizing a shape of a robot with an AR device, there is also a need to record (register) a robot model for each robot type, which increases the burden on the AR provider.

A method of manually aligning the position and orientation of an AR graphic displayed at a predetermined position and orientation with the position and orientation of an actual robot places an extremely heavy burden on the AR provider.

Further, if the AR device was moved away from the marker after recognizing the robot coordinate system with the AR device, there is the risk of not being able to precisely measure the positional relationship between the AR device and the marker, causing the displayed position of the AR graphic to be displaced. AR devices are equipped with gyro sensors or the like to detect movement, but even if the position and orientation are corrected based on the detection result, display displacement still occurs. Display displacement is particularly likely to occur at a time of rotational movement.

Therefore, there has been a strong demand for the development of a method capable of, regardless of the type of the robot, precisely measuring the positional relationship between an AR device and markers, and comparatively easily and with high precision recognizing the position or orientation of the robot with the AR device.

An aspect of a robot system according to the present disclosure is configured to include at least one or more reference indicators having reference characteristics with clear coordinates and being placed in a predetermined position; a robot coordinate system identification indicator being provided within a movement range of a robot and having identification characteristics for identifying a robot coordinate system; an indicator detecting unit that simultaneously detects at least one of the reference indicators and the robot coordinate system identification indicator in one detection operation; a robot system information receiving unit that receives information regarding the robot system; a robot coordinate system identifying unit that identifies a coordinate system of the robot from at least a position of the robot coordinate system identification indicator detected by the indicator detecting unit and coordinate system information received by the robot system information receiving unit; an augmented reality display device that displays the information regarding the robot system received by the robot system information receiving unit, based on the coordinate system of the robot identified by the robot coordinate system identifying unit; a coordinate system setting unit that sets an origin by moving the robot to a designated position; and a coordinate system information transmission unit that transmits the coordinate system information set by the coordinate system setting unit to the augmented reality display device.

In an aspect of the robot system according to the present disclosure, the position or orientation of the robot can be recognized by an AR device (augmented reality display device) comparatively easily, regardless of the type of the robot. In addition, so long as a reference indicator in a movement range of the AR device is placed within a detectable range, display position displacement of an AR graphic can be suppressed.

Therefore, according to an aspect of the robot system according to the present disclosure, it is always possible to precisely measure the positional relationship between the AR device, a robot coordinate system identification indicator, and a reference indicator regardless of the type of the robot, making it possible for the AR device to recognize the position or orientation of the robot comparatively easily and with high precision.

BRIEF DESCRIPTION OF THE DRAWINGS

FIG. 3 is a drawing used to describe a method of detecting a plurality of markers (indicators) to suppress position displacement in a robot system according to an aspect of the present invention; and FIG. 4 is a drawing used to describe a method of detecting a marker (indicator) to suppress position displacement in a robot system according to an aspect of the present invention.

DETAILED DESCRIPTION OF THE INVENTION

A robot system according to an embodiment of the present invention is described below with reference to FIG. 1 to FIG. 4.

Figure 1:
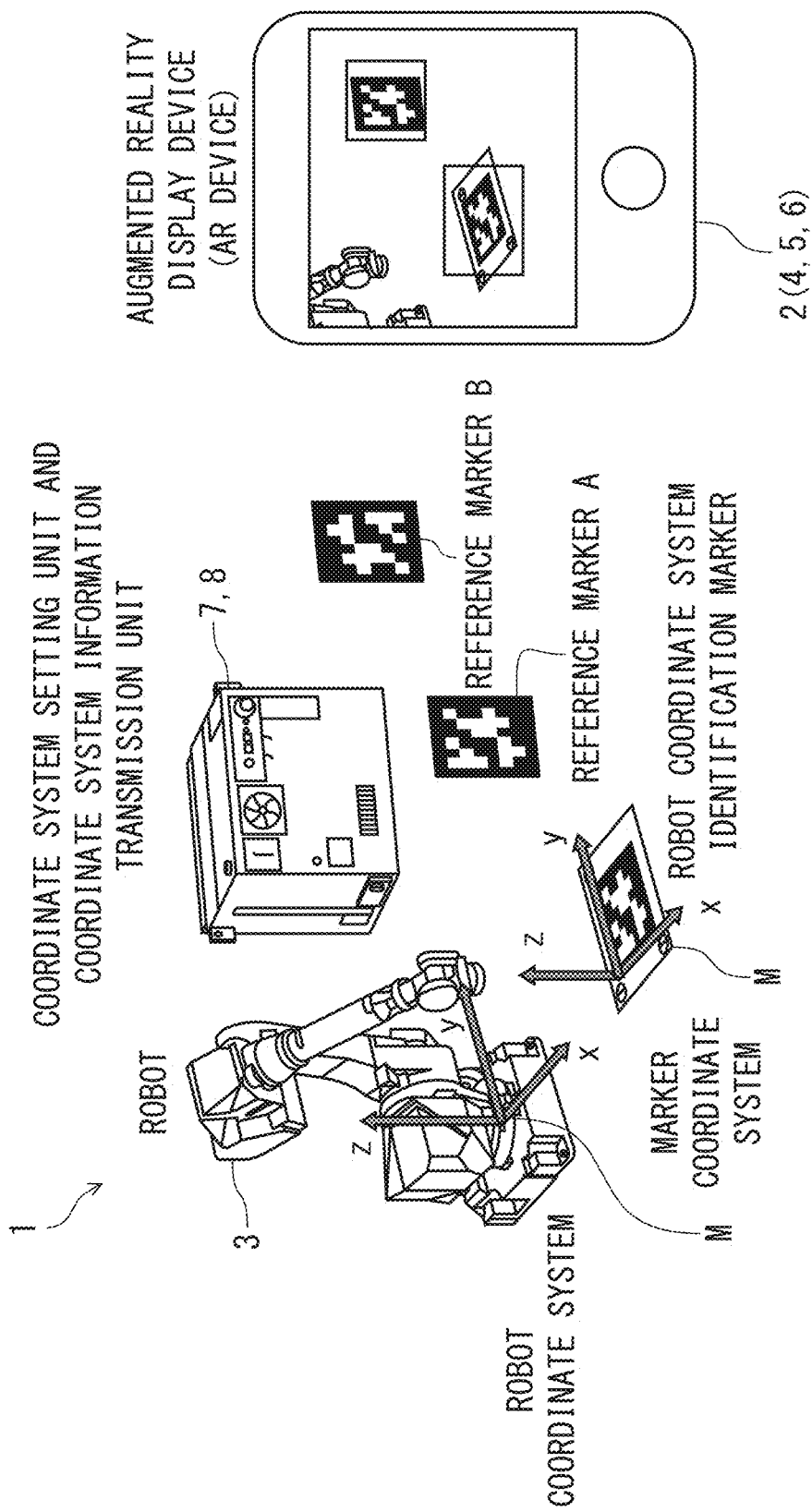
FIG. 1 is a drawing showing a robot system according to an aspect of the present invention.

As shown in FIG. 1, a robot system 1 according to the present embodiment is configured such that at least one or more reference markers A, B, etc., with clear coordinates (at least one or more reference indicators having reference characteristics with clear coordinates) are placed within a range of desired movement of an AR device (augmented reality display device) 2 such as a head-mounted display or a projector, a robot coordinate system identification marker M for identifying a robot coordinate system (a robot coordinate system identification indicator having identification characteristics for identifying the robot coordinate system) is placed within a movement range of a robot 3, and the AR device 2 simultaneously detects at least two of each of the reference markers A, B, etc., and the robot coordinate system identification marker M to recognize a position and orientation in the coordinate system set on the robot coordinate system identification marker M relative to the reference markers A, B, etc. So long as the augmented reality display device 2 includes at least an application for displaying a virtual model corresponding to a real equipment using an AR display unit (augmented reality display unit), the configuration thereof need not be particularly limited.

In this robot system 1, the coordinate system set on the coordinate system identification marker M is set relative to the coordinate system of the robot 3, allowing the AR device 2 to recognize the coordinate system of the robot 3. This makes it possible to precisely identify and display the position and orientation of the robot 3 with respect to, for example, a discharging line where a workpiece is transported on a conveyor, or a factory line with a lot of obstacles where the AR device 2 needs to move around, etc., making it possible to realize a useful and suitable system.

More specifically, the robot system 1 according to the present embodiment includes, as shown in FIG. 1, at least two or more reference markers A, B, etc., with clear coordinates, provided in a movement range of the AR device 2 such as a head-mounted display or projector, and at least one or more robot coordinate system identification markers M for identifying a robot coordinate system, provided in a movement range of the robot 3.

The robot system 1 according to the present embodiment includes a marker detecting unit (indicator detecting unit) 4 that detects at least the position of the reference markers A, B, etc., and the robot coordinate system identification marker M placed in predetermined positions, a robot system information receiving unit 5 that receives information regarding the robot system 1, a robot coordinate system identifying unit 6 that identifies a coordinate system of the robot from at least the position of the reference markers A, B, etc., and the robot coordinate system identification marker M detected by the marker detecting unit 4 and the coordinate system information received by the robot system information receiving unit 5, a coordinate system setting unit 7 that sets an origin by moving the robot 3 to a designated position, and a coordinate system information transmission unit 8 that transmits coordinate system information set by the coordinate system setting unit 7 to the AR device 2, wherein, based on the coordinate system of the robot 3 identified by the coordinate system identifying unit 6, the information regarding the robot system 1 received by the robot system information receiving unit 5 is displayed by the display unit (application) of the AR device 2.

The robot coordinate system identifying unit 6 is configured to identify the coordinate system of the robot 3 based on the coordinate system set on the robot coordinate system identification marker M by the coordinate system setting unit 7. In addition, the robot coordinate system identification marker M according to the present embodiment has a uniquely defined posture, and is placed within a movement range of the robot 3 or on the robot itself.

This robot system 1 is configured to recognize the position and orientation in the coordinate system set on the coordinate system identification marker M relative to the reference markers A, B, etc., by the AR device 2 simultaneously detecting at least two of each of the reference markers A, B, etc., and the robot coordinate system identification marker M.

Example 1: Position Alignment Based on the Coordinate System Set on the Robot Coordinate System Identification Marker An example of "position alignment based on the coordinate system set on the marker" is described below regarding the robot system 1 according to the present embodiment configured as described above.

As shown in FIG. 1, reference markers A and B are placed in the AR graphic. At this time, the reference marker A and the reference marker B are provided within a range where they can be simultaneously detected by the AR device 2.

The reference marker A and the reference marker B are simultaneously detected by the AR device 2. The AR device 2 thus recognizes the respective positions of the reference marker A and the reference marker B.

Next, the robot coordinate system identification marker M is placed within the movement range of the robot 3, and within a range where it can be detected by the AR device 2 simultaneously with any one of the reference markers (reference marker A in this example).

The robot 3 is moved, and the origin point, point in the X-direction, and point in the Y-direction of the robot coordinate system identification marker M is touched up (the origin is set) with a tool of the robot 3. The coordinate system is thus set on the robot coordinate system identification marker M.

Next, the robot coordinate system identification marker M and the reference marker A are simultaneously detected by the AR device 2. The AR device 2 thus recognizes the coordinate system in the robot coordinate system identification marker M, and the positional relationship between each of the reference marker A, the reference marker B, and the robot coordinate system identification marker M. Further, the coordinate system in the robot coordinate system identification marker M recognizes the coordinate system of the robot 3.

A robot coordinate system corresponding to the coordinate system in the robot coordinate system identification marker M is transmitted from the robot 3 to the AR device 2 (from a robot controller to an AR device controller). This allows the AR device 2 to recognize the coordinate system of the robot 3.

So long as the reference markers A and B are within a range where they can be detected by the AR device 2, display position displacement of the AR graphic can be suppressed.

After the AR device 2 has recognized the coordinate system of the robot 3, the robot coordinate system identification marker M may be removed from its placement location.

Figure 2:
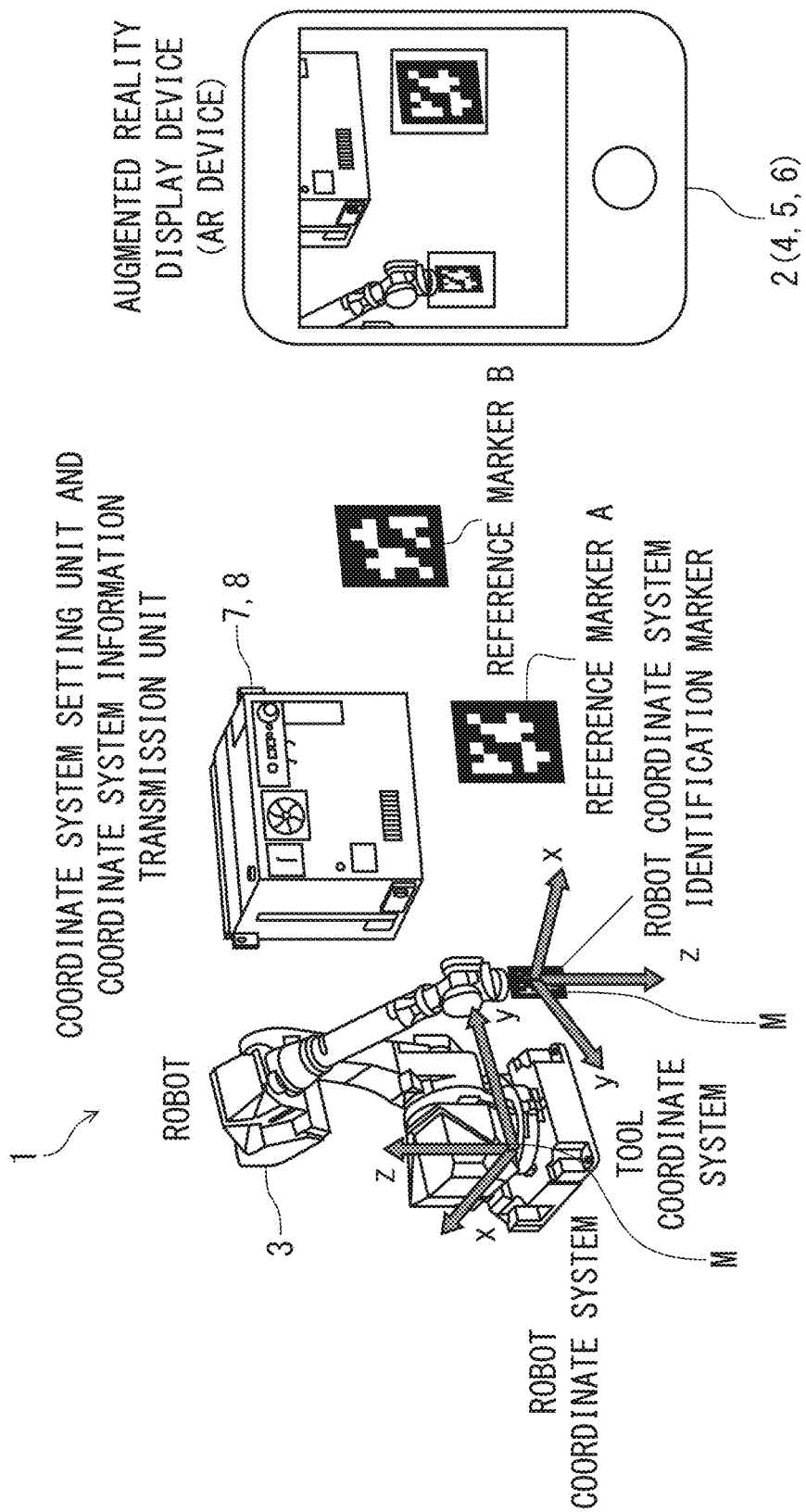
FIG. 2 is a drawing showing a robot system according to an aspect of the present invention.

Example 2: Position Alignment Based on a Coordinate System Set on a Robot Coordinate System Identification Marker Placed on a Robot Hand Next, an example of "position alignment based on a coordinate system set on a marker (tool coordinate system marker) placed on the hand of a robot", as shown in FIG. 2, will be described.

The reference markers A and B are placed in the AR graphic. At this time, the reference marker A and the reference marker B are provided within a range where they can be simultaneously detected by the AR device 2.

The reference marker A and the reference marker B are simultaneously detected by the AR device 2. In this way, the AR device 2 recognizes the respective positions of the reference marker A and the reference marker B.

Next, the robot coordinate system identification marker M is placed on the hand of the robot 3. A tool coordinate system is set with respect to the placed robot coordinate system identification marker M.

The robot coordinate system identification marker M and the reference marker A are simultaneously detected by the AR device 2. The AR device 2 thus recognizes the tool coordinate system in the robot coordinate system identification marker M, and the positional relationship between each of the reference marker A, the reference marker B, and the robot coordinate system identification marker M. Further, the tool coordinate system in the robot coordinate system identification marker M recognizes the coordinate system of the robot 3.

A robot coordinate system corresponding to the coordinate system in the robot coordinate system identification marker M is transmitted from the robot 3 to the AR device 2 (from a robot controller to an AR device controller). This allows the AR device 2 to recognize the coordinate system of the robot 3.

So long as the reference markers A and B are within a range where they can be detected by the AR device 2, display position displacement of the AR graphic can be suppressed.

After the AR device 2 has recognized the coordinate system of the robot 3, the robot coordinate system identification marker M may be removed from its placement location.

Therefore, in the robot system 1 according to the present embodiment, the position or orientation of the robot 3 can be comparatively easily recognized by the AR device 2 regardless of the type of the robot 3. In addition, by placing the reference markers A, B, etc., within a movement range of the AR device 2, displacement of the display position of the AR graphic can be suppressed so long as the reference markers A, B, etc., are within a detectable range.

As such, according to the robot system 1 according to the present embodiment, it is always possible to precisely measure the positional relationship between the AR device 2 and the robot coordinate system identification marker M regardless of the type of the robot 3, making it possible for the AR device 2 to recognize the position or orientation of the robot 3 comparatively easily and with high precision.

In the robot system 1 according to the present embodiment, as shown in FIG. 3, when three or more reference markers A, B, C, D, etc., are provided, detecting any two of the reference markers A, B, C, D, etc., simultaneously makes it possible to recognize the robot coordinate system from any of the reference markers A, B, C, D, etc.

Further, as shown in FIG. 4, so long as the AR device 2 detects any of the reference markers A, B, C, D, etc., display displacement of the AR graphic can be suppressed.

An embodiment of the robot system has been described above, but the invention is not limited to the above embodiment, and various modifications are possible without departing from the spirit and scope of the invention.

EXPLANATION OF REFERENCE NUMERALS

1 Robot system
2 AR device (augmented reality display device)
3 Robot
4 Marker detecting unit (indicator detecting unit)
5 Robot system information receiving unit
6 Robot coordinate system identifying unit
7 Coordinate system setting unit
8 Coordinate system information transmission unit
A-D Reference marker (reference indicator)
M Robot coordinate system identification marker (robot coordinate system identification indicator)

What is claimed is:

1. A robot system comprising:
   at least one or more reference indicators having reference characteristics with clear coordinates and being placed in a predetermined position;
   a robot coordinate system identification indicator being provided within a movement range of a robot and having identification characteristics for identifying a robot coordinate system;
   an indicator detecting unit configured to simultaneously detect at least one of the reference indicators and the robot coordinate system identification indicator in one detection operation;
   a robot system information receiving unit configured to receive information regarding the robot system;
   a robot coordinate system identifying unit configured to identify a coordinate system of the robot from at least a position of the robot coordinate system identification indicator detected by the indicator detecting unit and coordinate system information received by the robot system information receiving unit;
   an augmented reality display device configured to display the information regarding the robot system received by the robot system information receiving unit, based on the coordinate system of the robot identified by the robot coordinate system identifying unit;
   a coordinate system setting unit configured to set an origin by moving the robot to a designated position; and
   a coordinate system information transmission unit configured to transmit the coordinate system information set by the coordinate system setting unit to the augmented reality display device.

2. The robot system according to claim 1, wherein the robot coordinate system identifying unit identifies the coordinate system of the robot based on a coordinate system set on the robot coordinate system identification indicator by the coordinate system setting unit.

3. The robot system according to claim 1, wherein the robot coordinate system identification indicator has a uniquely defined posture, and is placed within a movement range of the robot or on the robot itself.

4. The robot system according to claim 2, wherein the robot coordinate system identification indicator has a uniquely defined posture, and is placed within a movement range of the robot or on the robot itself.

* * * * *